United States Patent Office 3,409,664
Patented Nov. 5, 1968

3,409,664
FUNCTIONALLY-SUBSTITUTED ETHYL-
MERCAPTOCYCLOHEXANONES
Sheldon Chibnik, Plainfield, Harold M. Foster, Middlesex, Harold A. Kaufman, New Brunswick, and Laverne A. Glick, Edison, N.J., assignors to Mobil Oil Corporation, a corporation of New York
No Drawing. Filed Dec. 20, 1965, Ser. No. 515,252
5 Claims. (Cl. 260—488)

This invention relates to mercaptocyclohexanones. It is more particularly concerned with a novel class of substituted 3-ethylmercaptocyclohexanones.

The compounds of this invention are 3-ethylmercaptocyclohexanones having certain functional groups in the 2-position of the ethylmercapto group, as more fully described hereinafter. These substituted cyclohexanones are valuable intermediates in the synthesis of 4-hydroxybenzothiophenes. The latter are converted into benzothienyl carbamates, an effective class of pesticides, as fully disclosed in copending application Ser. No. 487,333, filed Sept. 14, 1965, a continuation-in-part of copending application Ser. No. 427,089, filed Jan. 21, 1965, a continuation-in-part of copending application Ser. No. 334,581, filed Dec. 30, 1963, a continuation-in-part of application Ser. No. 220,073, filed Aug. 28, 1962.

In order to prepare the 4-hydroxybenzothiophenes, the compounds of this invention are first subjected to hydrolysis and ring closure using strong mineral acid catalysts, to produce partly saturated 4-ketobenzothiophenes. A method of effecting the ring closure of the compounds of this invention is, in part, the subject matter of copending application Ser. No. 515,228, filed concurrently herewith. The partly saturated 4-ketobenzothiophenes are converted to the 4-hydroxybenzothiophenes by liquid or vapor phase dehydrogenation. Typical procedures for effecting such dehydrogenation are described in copending applications Ser. No. 455,604, filed May 13, 1965; Ser. No. 458,771, filed May 25, 1965; and Ser. No. 468,094, filed June 29, 1965.

Accordingly, it is a broad object of this invention to provide a novel class of substituted cyclohexanones. Another object is to provide novel substituted ethylmercaptocyclohexanones. A specific object is to provide novel functionally substituted 3 - ethylmercaptocyclohexanones. Other objects and advantages of this invention will become apparent to those skilled in the art, from the following detailed description.

In general, this invention provides compounds having the formula:

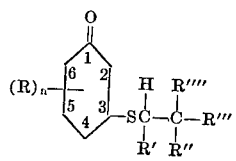

wherein R is an alkyl $(C_1-C_8)$, alkenyl $(C_2-C_8)$, alkoxy $(C_1-C_4)$, alkylthio $(C_1-C_4)$, di$(C_1-C_4)$alkylamino, or cyano; $n$ is 0 to 3; R' is H, alkyl $(C_1-C_8)$, alkenyl $(C_2-C_8)$, alkoxy $(C_2-C_8)$, halogen, or alkylthio $(C_1-C_8)$; R'', R''', and R'''' are H, hydroxyl, alkoxy $(C_1-C_8)$, mercapto, alkylthio $(C_1-C_8)$, halogen, amino, alkylamino $(C_1-C_8)$, dialkylamino $(C_1-C_8)$, or acetoxy; or R''' and R'''' together are a bivalent group selected from =O, =S,

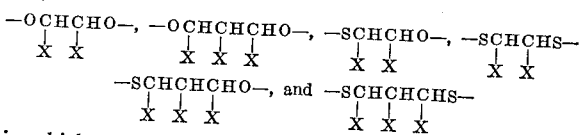

in which X is H, alkyl $(C_1-C_8)$, or alkenyl $(C_2-C_8)$.

Compounds of this invention that are particularly useful as intermediates for preparing 4-hydroxybenzothiophene are those having the formula:

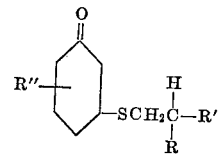

wherein R is H or alkoxy $(C_1-C_8)$ and R' is alkoxy $(C_1-C_8)$, halogen, or acetoxy, and R'' is alkyl $(C_1-C_8)$ or alkenyl $(C_2-C_8)$.

The compounds of this invention can be prepared by several methods, but the particular method of synthesis used is not a pertinent factor or feature of this invention. Indeed, any method that will produce the compounds of this invention can be employed. For example, as is illustrated hereinafter, a 2-mercaptoethyl derivative having a functional group of groups on the 1-position, such as 2-mercaptoethyl acetate, can be reacted with 2-cyclohexen-1-one, by adding the mercapto group across the double bond. Generally, such addition is effected at temperatures ranging from ambient temperatures up to about 100° C., with or without the use of catalysts.

Another method for the synthesis of the compounds of this invention, involves the reaction between 3-mercaptocyclohexanone and an olefinic compound containing the functional group or groups. The 3-mercaptocyclohexanone is readily prepared by the addition of hydrogen sulfide across the double bond of 2-cyclohexen-1-one. This method of synthesis is illustrated in the following typical equations:

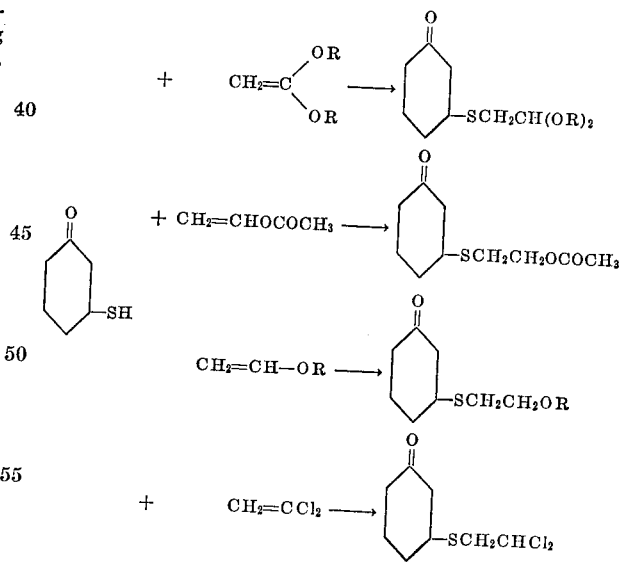

Non-limiting examples of typical compounds of this invention are 3-(2,2-diethoxyethylmercapto)cyclohexanone;
3-(2,2-dimethoxyethylmercapto)-5-ethylcyclohexanone;
3-(2,2-dioctoxyethylmercapto)cyclohexanone;
3-(2-acetoxyethylmercapto)-4-hexenylcyclohexanone;
3-(2-bromoethylmercapto)cyclohexanone;
3-(2-chloroethylmercapto)cyclohexanone;
3-(2-acetoxyethylmercapto)cyclohexanone;
3-(2,2-dimethoxyethylmercapto)-4-methylcyclohexanone;
3-(2-ethoxyethylmercapto)cyclohexanone;
3-(2,2-dichloroethylmercapto)cyclohexanone;

3-(2,2-dimethoxyethylmercapto)cyclohexanone;
3-(2,2-dimethoxyethyl)-5-octylcyclohexanone, and
3-(2,2-dimethoxyethyl)-6-propenylcyclohexanone.

In many instances, the compounds to be disclosed in this invention were recognized and/or first identified by V.P.C. (Vapor Phase Chromatographic) analysis. In several instances pure samples were obtained by condensing the effluent from a V.P.C. column. The retention time of these compounds by V.P.C. analysis is an important, and sometimes only, physical property available for characterization. The following description of conditions and parameters will serve to form the basis for a description of the physical property "V.P.C. retention time" on a new column designated Column A.

Instrument: model No. 720, F & M Scientific Corp., Avondale, Pa.
Column size: ¼″ O.D. x 2′
Column packing: 10% silicone gum nitrile, General Electric XE-60, on Diatoport W, acid washed, purchased from F & M Scientific Corp.
Carrier gas: helium outlet flow: 60 mls. per min. @ 40 p.s.i.g.
Injection port temp.: 300° C.
Detector block temp.: 345° C.
Chart speed: one-half inch per minute
Detector current: 100 ma.
Column conditions: 100° C. at injection, then program at 10° C. per minute to 250° C. and hold as long as required.

Based on the foregoing, some typical "V.P.C. retention times" for Column A are as follows:

| Compound | Sample Size, µl. | Column A (from injection) "V.P.C. Retention Time," minutes |
| --- | --- | --- |
| 2-cyclohexen-1-one | 1 | 3.5–3.7 |
| Dimethyl mercaptoacetal | 1 | 1.5–1.7 |
| Diethyl mercaptoacetal | 1 | 2.2–2.4 |
| 2-mercaptoethyl acetate | 1 | 2.6–2.8 |

In a similar manner, some work was done using an old "well-conditioned" V.P.C. column, designated Column B. All conditions and parameters are otherwise as described hereinabove. Some typical "V.P.C. retention times" for Column B are as follows:

| Compound | Sample Size, µl. | Column B "V.P.C. Retention Time," minutes |
| --- | --- | --- |
| 2-cyclohexen-1-one | 1 | 2.1–2.3 |
| 2-mercaptoethyl acetate | 2 | 1.5–1.7 |
| 2-mercaptoethyl chloride | 2 | 0.7–0.9 |

Example 1

To a mixture of diethyl mercaptoacetal (ten drops) and 2-cyclohexen-1-one (ten drops) was added two drops of piperidine. The reaction mixture was shaken to provide good mixing. It was noted that an exothermic reaction had occured. After one-half hour, approximately 15% of the adduct had formed. Results of V.P.C. analysis (2 µl. sample of reaction mixture) was as follows:

Column A, "V.P.C. Retention Time," minutes
Compound:
  Diethyl mercaptoacetal ------------------ 2.5
  2-cyclohexen-1-one ---------------------- 3.6
  "Adduct," 3-(2,2-diethoxyethylmercapto) cyclohexanone ------------------------ 14.65

In a larger scale run, the boiling point of the "adduct" was 123–125° C./0.9 mm. $n_D^{20}$ 1.4872; this latter sample was 95% pure (V.P.C. analysis).

A sample obtained by condensing the effluent from a V.P.C. column had infrared and nuclear magnetic resonance spectra consistent with the proposed structure.

Example 2

To a mixture of 2-cyclohexen-1-one (22.7 g.) and dimethyl mercaptoacetal (28.9 g.) was added piperidine (0.5 g.). A violent exotherm was noted; the temperature rose to 95° C. within one to two minutes. After standing at room temperature, during stirring, for about a day, approximately 50% of the adduct had formed. Results of V.P.C. analysis (1 µl. sample of reaction mixture) are as follows:

Column A, "V.P.C. Retention Time," minutes
Compound:
  Dimethyl mercaptoacetal ----------------- 1.7
  2-cyclohexen-1-one ---------------------- 3.5
  "Adduct," 3-(2,2-dimethoxyethylmercapto) cyclohexanone ----------------------- 14.25

A sample obtained by condensing the effluent from a V.P.C. column had infrared and nuclear magnetic resonance spectra consistent with the proposed structure.

Example 3

A mixture of 2-cyclohexen-1-one (41.4 g.), 2-mercaptoethyl acetate (64 g.) and acetic acid (5. g.) was heated at 80° C. during stirring for two days. An additional 50 ml. of acetic acid was added and heating was continued for four more hours. After removal of the acetic acid, the residual oil was distilled under reduced pressure. One of the fractions, B.P. 112–115° C./0.18 mm., $n_D^{20}$ 1.5056, contained "Adduct" in addition to both starting materials. V.P.C. analysis (2 µl. sample) gave the following results:

Column A, "V.P.C. Retention Time," minutes
Compound:
  2-mercaptoethyl acetate ----------------- 2.8
  2-cyclohexen-1-one ---------------------- 3.7
  "Adduct," 3-(2-acetoxyethylmercapto) cyclohexanone ----------------------- 16.2

A pure sample was obtained by condensing the effluent from a V.P.C. column.

Analysis.—Calcd. for $C_{10}H_{16}O_3S$: C, 55.52; H, 7.46. Found: C, 55.59, 55.61; H, 7.78, 7.73.

The infrared and nuclear magnetic resonance spectra of this sample were consistent with the proposed structure.

Example 4

A mixture of 2-cyclohexen-1-one (9.6 g.), 2-mercaptoethyl acetate (12 g.) and acetic acid (0.5 g.) was heated at 50–60° C. during stirring. After one day, approximately 25% of the adduct had formed. Results of V.P.C. analysis (2 µl. sample of reaction mixture) are as follows:

Column B, "V.P.C. Retention Time," minutes
Compound:
  2-mercaptoethyl acetate ----------------- 1.6
  2-cyclohexen-1-one ---------------------- 2.2
  "Adduct," 3-(2-acetoxyethylmercapto) cyclohexanone ----------------------- 14.0

Example 5

A mixture of 2-cyclohexen-1-one (35 g.), 2-mercaptoethyl chloride (40 g.) and acetic acid (2 g.) was stirred at room temperature for four days. At this time, approximately 30% of the adduct was present. Results of V.P.C. analysis (2 µl. sample of reaction mixture) are as follows:

Column B, "V.P.C. Retention Time," minutes
Compound:
  2-mercaptoethyl chloride ---------------- 0.7
  2-cyclohexen-1-one ---------------------- 2.1
  "Adduct," 3-(2-chloroethylmercapto) cyclohexanone ----------------------- 12.5

In the foregoing examples, typical mercapto-substituted cyclohexanones of this invention have been illustrated and characterized. As those skilled in the art will recognize, substituted derivatives can be made readily. For example, in place of the 2-cyclohexen-1-one reactant, a ring-substituted derivative can be used. Also, the adducts, such as those of the examples, can be further substituted by methods well known in the art, including bromination and chlorination of the ring.

Although the present invention has been described with preferred embodiments, it is to be understood that modifications and variations may be restored to, without departing from the spirit and scope of this invention, as those skilled in the art will readily understand. Such variations and modifications are considered to be within the purview and scope of the appended claims.

What is claimed is:
1. A compound having the formula:

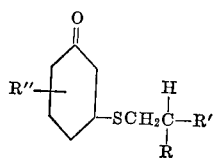

wherein R is selected from the group consisting of hydrogen and alkoxy ($C_1$–$C_8$), R' is selected from the group consisting of alkoxy ($C_1$–$C_8$), halogen, and acetoxy, and R'' is selected from the group consisting of hydrogen, alkyl ($C_1$–$C_8$), and alkenyl ($C_2$–$C_8$).

2. The compound defined in claim 1, wherein R and R' are ethoxy and R'' is hydrogen.

3. The compound defined in claim 1, wherein R and R' are methoxy and R'' is hydrogen.

4. The compound defined in claim 1, wherein R' is acetoxy and R and R'' are hydrogen.

5. The compound defined in claim 1, wherein R' is chloro and R and R'' are hydrogen.

References Cited

UNITED STATES PATENTS
2,465,882   3/1949   Kendall et al. _____ 260—586

OTHER REFERENCES

Chem. Abstracts: 54; 336c (1960); 56; 2344a (1962); 47; 8012e (1953).

LORRAINE A. WEINBERGER, *Primary Examiner.*

V. GARNER, *Assistant Examiner.*